No Printed Specification Available

8039X

B. F. STICKNEY.

Steam Plow.

Patented Mar. 1, 1834.

AN. PHOTO-LITHO. CO. N.Y. (OSBORNE'S PROCESS.)

No 13
Mar. 1. 1834

8039x

Benjamin F. Stickney. Michigan.

Letters Patent. Mar. 1. 1834.

The Schedule referred to in these Letters Patent, and making part of the same, containing a description in the words of the said Benjamin Franklin Stickney, himself of his improvement called the Agricultural Pulverizer.

To all to whom these presents shall come.

Be it known that I Benjamin Franklin Stickney, of Vistula County of Monroe & Teritory of Michigan, have invented a new and useful improvement in Agriculture consisting of a machine to which he has given the name of Agricultural Pulverizer, intended to be used in the tillage of ground by a revolving percussive action of cutters or hoes by which the earth weeds, straw roots &c. in the earth or on the surface are cut fine removed & finely pulverized performing all the offices now performed by the plough the harrow &c. and in a more perfect manner & great saving of labour & that the following is a full & exact description of the construction & operation of the said Machine as invented by me.

Figure 1:
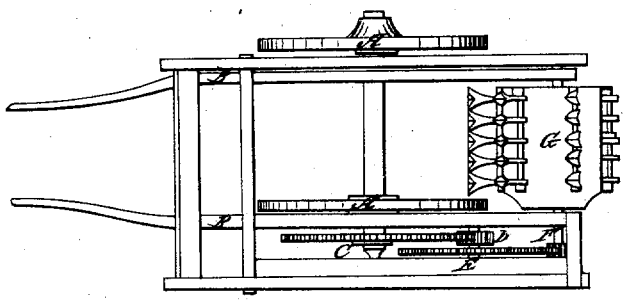

Fig 1. of the accompanying drawings A.A. two wheels to roll on the ground which by a horse harnessed to the shafts B.B. for draft constitutes the original moving power to propel the Machine C. a cog wheel confined to the same axle of the wheels A.A. D. a burr into which cog wheel C. strikes & is immediately fixed to a shaft on which is cog wheel E. this wheel strikes into burr F. on the shaft of which is a cylinder G. to the periphery of which is attached 16 rows of iron hoes or cutters, extending the whole length of the cylinder attached to the surface playing on a rod making a joint that admits the hoe to fall back but no farther forward than to a right line from the centre to the circumference. This is effected by a toe at the joint of the shoe before and

Figure 2:
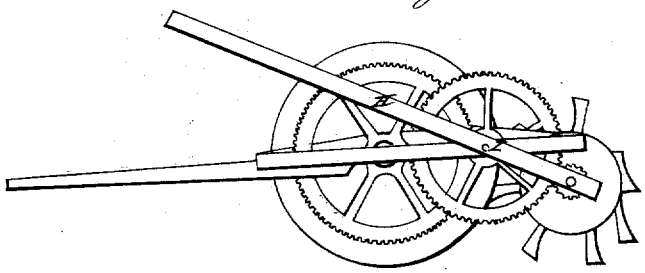

RS and not behind the centre [illegible] that [illegible] on a plate on
the surface of the cylinder. By a rapid revolution of this
cylinder the [illegible] cut the earth [illegible] into fine shavings & throw
it with violence in the opposite direction from that in which
the machine moves — There are two Levers that appear more
distinctly in the side view Fig 2. H is the lever moving on the
same centre as the cog wheel F. in Fig 1 at I by which the cylinder
can be raised & depressed without affecting the gearing of the
Cog work. — The proportions of the parts may be made to suit the
operators. The proportions proposed are wheels A A. 6 feet in
diameter cog wheel C five feet burr D 4 inches, cog wheel E
5 feet burr E 6 inches & the periphery of the circle described in
the revolutions of the hoes 6 feet. —

It is proposed that if the smooth surface of the wheel
that rolls on the ground should be found not to revolve
with its axle but slip on the ground, to insert points of
iron to project from the surface to [illegible] with iron
plates or attach dogs that should prevent the sliding
of the wheels.

Witnesses — Benj. Franklin Stickney

Chas. M. Keller

Henry Bishop — Drawing — 624 [illegible]

E.S.

C.M.K.